United States Patent [19]
Hadzeriga

[11] 3,853,981
[45] Dec. 10, 1974

[54] LIQUID ION EXCHANGE PROCESS FOR THE RECOVERY OF METALS

[75] Inventor: Pablo Hadzeriga, Arvada, Colo.

[73] Assignee: Cyprus Mines Corporation, Los Angeles, Calif.

[22] Filed: June 26, 1972

[21] Appl. No.: 266,456

[52] U.S. Cl............ 423/24, 423/32, 423/100, 423/109, 423/105, 75/103, 75/101 BE, 75/117, 75/120, 204/106, 204/114
[51] Int. Cl........ C01g 3/00, C01g 3/10, C01g 3/14, C01g 9/00, C22b 15/10, C22b 19/24, C22b 19/26
[58] Field of Search......... 423/24, 32, 33, 109, 100, 423/105; 75/100 BE, 101 R, 103, 117

[56] References Cited
UNITED STATES PATENTS
2,805,918  9/1957  Van Hare et al............... 423/105
2,839,388  6/1958  Van Hare et al............... 423/105 X Primary Examiner—Herbert T. Carter
Attorney, Agent, or Firm—Sheridan, Ross & Fields

[57] ABSTRACT

An ion exchange process for selectively recovering a first metal in solution from a second metal without build-up of the second metal in the circuit. The process comprises first separating from the ion exchange recovery circuit for the first metal a bleed stream of the aqueous which is recycled to the leaching stage to maintain a required concentration of first metal in the leaching stage. The remaining aqueous is further contacted countercurrently with barren organic to completely remove all of the first metal from it. The aqueous is then sent to a recovery circuit for the second metal. After the second metal recovery the raffinate from this stage is returned to the leaching stage. The result is that the second metal is removed from the system at substantially the same rate at which it is introduced into the leaching stage in the continuous process.

10 Claims, 1 Drawing Figure

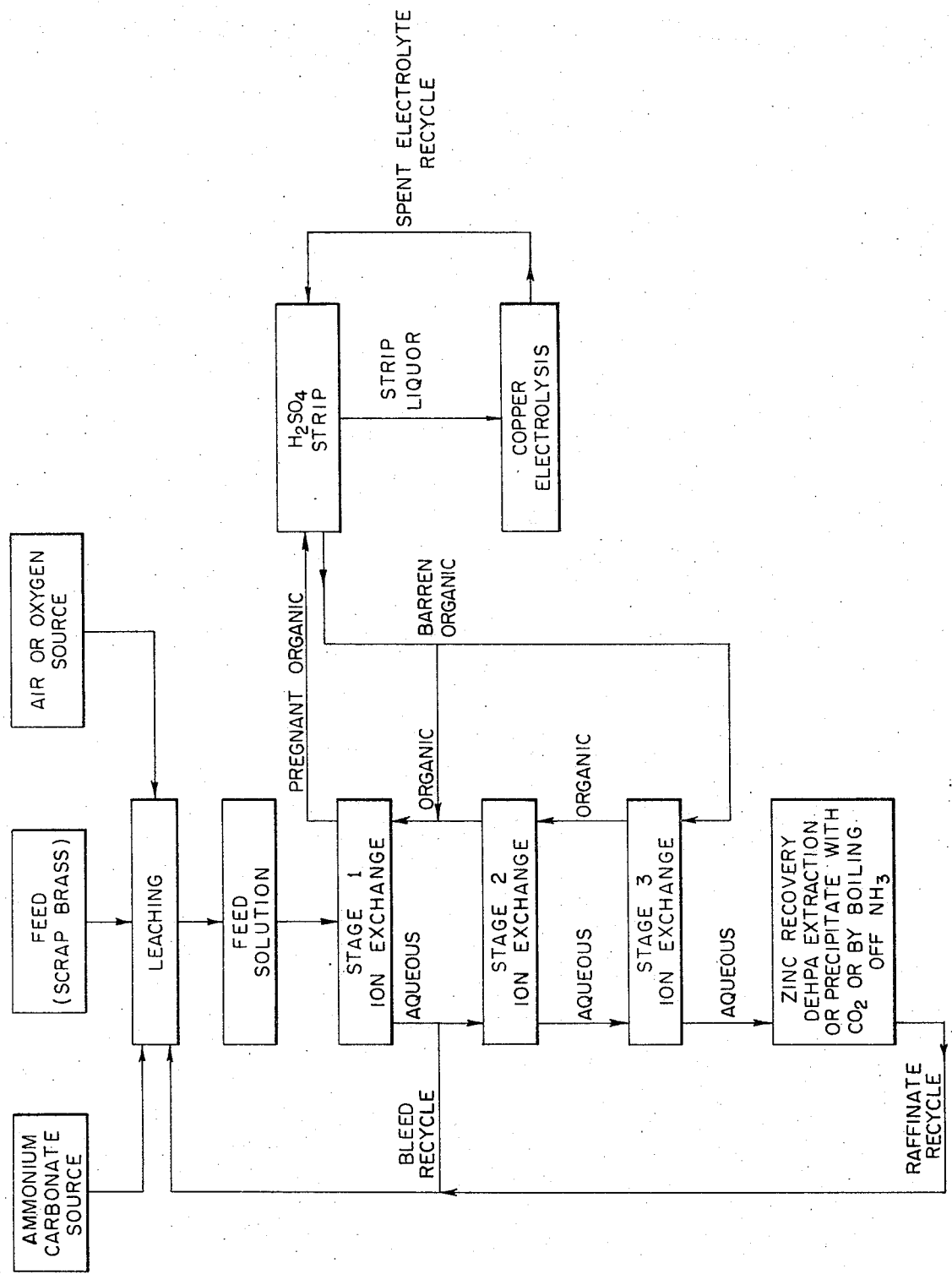

LIQUID ION EXCHANGE PROCESS FOR THE RECOVERY OF METALS

BACKGROUND OF THE INVENTION

The increasing world-wide scarcity of copper with consequent increase in price has stimulated a demand for an economical process for recovering copper from scrap brass and other copper alloys. The present invention is related to a process for recovering copper from ammoniacal solutions used to leach scrap copper alloys, particularly, brass and bronze.

The art for leaching copper from its ores and alloys with ammoniacal solutions is well developed. For example, it is known that a leach solution of 30 g/l $NH_3$ and 30 g/l of $(NH_4)_2 CO_3$ will dissolve 40 g/l of copper. It is also well known that a certain amount of cupric copper must be present in the solution to maximize the rate at which copper is dissolved. Otherwise, without adequate oxidation, the metallic copper will reduce any cupric ion present in solution in accordance with the reaction: $Cu^o + Cu^{++} \longleftrightarrow 2 Cu^+$ and leaching will cease. Therefore, during leaching air or oxygen is bubbled through the leach solution to oxidize the cuprous ion to cupric.

While ammoniacal leaching provides an effective means for solubilizing copper and zinc from scrap brass, it is difficult to recover the copper from the leach solution in the presence of dissolved zinc.

Most of the ion exchange extractants for copper are not sufficiently selective for copper to permit their use for effectively separating this metal in solution in the presence of other metals. However, the General Mills Company of Minneapolis, Minn. has introduced on the market some copper ion exchange agents sold under the names of LIX–63, LIX–64, LIX–64N, LIX–65N and LIX–70 which are highly selective to copper. One of the active agents of some of these extractants, LIX-–64 and LIX–64N, for example, is a 2-hydroxy benzophenoxime as disclosed in U.S. Pat. No. 3,428,449. Although the problem which the present invention solves arises with the use of selective extractants, the extractants themselves form no part of the invention as the invention finds application with the use of selective extractants in general.

The chief disadvantage of the use of selective solvent extractants for separating copper values from solutions containing zinc values is that zinc if not removed builds up in the leach solution during a continuous process. Upon dissolving additional copper, the zinc precipitates as a basic carbonate and coats the surface of undissolved scrap, thus retarding further copper solution. Various expedients to combat this, such as agitation leach, have been resorted to by the prior art.

Accordingly, it is a principal object of the invention to provide an ion exchange process for the selective recovery of a first metal in solution with a second metal in which build-up of the second metal in the leach solution is prevented.

Another object of the invention is to provide an ion exchange process as stated for the principal object in which both metals are recovered in commercial grade purity.

A further object of the invention is the provision of an ion exchange process for the recovery of copper in solution with zinc in which build-up of zinc in the feed solution is prevented and commercial grade copper and zinc are recovered in quantitative amounts.

Copper is extracted with a copper selective ion exchange agent from an ammoniacal leach solution of scrap brass containing copper and zinc values. A prescribed portion of aqueous from the copper extraction step is recycled to the leach solution to maintain enough cupric copper therein to expedite leaching. Zinc build-up in the leach solution is prevented by sending the remaining aqueous to a zinc recovery circuit where zinc is removed and the raffinate from this stage recycled to the leaching stage. To insure maximum copper recovery and that the recovered zinc is of commercial grade and not contaminated with copper, the remaining aqueous referred to above is contacted in at least one countercurrent extraction stage with barren organic for complete removal of copper before reaching the zinc recovery circuit.

DETAILED DESCRIPTION OF THE INVENTION

The operation of the invention is described with reference to the accompanying drawing of the flow sheet.

The drawing is a schematic showing of the ion exchange system in which an illustrative embodiment or application of the process is presented. This system was used in obtaining the results presented further on in the specification. In the drawing a conventional liquid ion exchange circuit for the recovery of copper from an ammoniacal leach solution is represented followed by a conventional sulfuric acid stripping circuit followed by an electrolysis step for electrowinning copper. A bleed recycle of a portion of the aqueous from the first copper recovery stage to the leaching stage is shown with another portion of the aqueous going through two additional copper recovery stages before proceeding to a zinc recovery circuit. The direction of the arrows indicates the countercurrent travel of aqueous and organic phases.

In the description which follows the combination of the first ion exchange stage, the $H_2SO_4$ strip and the copper electrolysis will be referred to as the copper recovery circuit, while ion exchange stages 2 and 3 with the zinc recovery stage will be referred to as the zinc recovery circuit. The recycle of the aqueous bleed from stage 1 is referred to as the bleed recycle and the recycle of the raffinate from the zinc recovery stage is referred to as the raffinate recycle, the main stream of the aqueous proceeding through stages 1, 2 and 3.

The leach solution comprises copper and the zinc values dissolved in an ammoniacal solution containing about equal amounts of ammonia or ammonium hydroxide and ammonium carbonate. An ammonium carbonate source is available to adjust the composition of the leaching solution. Each of the stages 1, 2 and 3 includes a conventional mixer-settler system to perform the separation.

The organic solvent was prepared using the above-mentioned extractants dissolved in an inert diluent, such as Napoleum 470, a hydrocarbon distillation fraction. Other conventional organic diluents may be used. The concentration of extractant in the solvent will depend on the desired characteristic of the circuit.

Air or oxygen is introduced in the leaching step to oxidize copper to the cupric form to increase leaching rate. The feed solution goes to stage 1 where more than 50% of the copper is extracted into the organic phase.

The pregnant organic moving countercurrently to the aqueous phase goes to the sulfuric acid stripping circuit where the copper is stripped and copper sulfate liquor goes to electrolysis where metallic copper is recovered at the cathode with the reformation of sulfuric acid which is recycled back to the stripping stage. The barren organic from the $H_2SO_4$ stripping stage is diverted to extraction stages 1 and 3.

A portion of aqueous from stage 1 is recycled to the leaching stage as a bleed for further dissolution of copper. It is important to recycle a substantial amount of cupric copper to the leach solution as its presence maximizes the rate of leaching of copper from the brass scrap as explained earlier. The amount of copper which must be recycled for a continuous process can be calculated and a prescribed portion of the aqueous diverted accordingly.

The remainder of the aqueous travels from stage 1 to stages 2 and 3 where it is countercurrently contacted with barren organic to provide an effective recovery of any copper remaining in this portion.

From stage 3 the substantially copper-free portion of aqueous goes to the zinc recovery circuit where zinc is recovered by conventional solvent extraction with di 2-ethyl hexyl phosphoric acid [DEHPA] or by precipitation by addition of carbon dioxide or by boiling off ammonia, procedures well known in the art. Commercial grade substantially copper-free basic zinc carbonate, zinc oxide or the metal is finally recovered by conventional procedures.

The raffinate from the zinc removal stage is recycled and mixed with the bleed stream of aqueous from the first stage for return to the leaching stage. The amount of aqueous going to the zinc recovery circuit should be sufficient for removal of a quantity of zinc equal to that dissolved in the leaching stage. Contacting countercurrently the portion of aqueous from stage 1 going to the zinc recovery circuit with barren organic in stages 2 and 3 before zinc recovery insures removal of substantially all of the copper with the result that the zinc recovered meets commercial grade specifications. The barren organic is more effective for removal of the remaining copper in the aqueous than partially loaded organic.

Ammonia and carbon dioxide losses are a consideration for a commercially feasible process and they must be held to a minimum. The reaction involved in the extraction process for the recovery of copper is:

$$Cu(NH_3)_4^{++} + 2(OH)^- + 2RH + 2\,H_2O \longleftrightarrow R_2Cu + 4\,NH_4OH$$

so that for this reaction the ammonia leach solution is completely regenerated. However, some losses of ammonia and $CO_2$ do occur during the operation of the process. Losses of both gases are kept at a minimum by recycling the aqueous from the copper recovery circuit and the raffinate from the zinc recovery circuit.

The process of the invention was performed in accordance with the flow sheet of the drawing. The results in terms of material balances set forth in Tables 1 and 2 below are representative of those obtained in practice.

The aqueous feed used for the results presented in Table 1 had a pH between 11.4 and 12 and the following composition:

| COMPONENT | G/L |
| --- | --- |
| Cu | 34 – 35 |
| Zn | 9.5 – 9.7 |
| $NH_3$ | 40 – 55 |
| $CO_2$ | 21.4 – 21.6 |

The aqueous feed for the results of Table 2 had a pH of 10.4 and the following composition:

| COMPONENT | G/L |
| --- | --- |
| Cu | 29.6 |
| Zn | 9.15 |
| $NH_3$ | 29.2 |
| $CO_2$ | 30.7 |

The organic phase for copper recovery consisted of 10% LIX–64N, 5% isodecanol and 85% Napoleum 470 (volume percentages). The loaded organic was stripped with a 200 g/l $H_2SO_4$ solution. The process was operated at room temperature. The copper strip liquor was fed to a small electrolytic cell whereby copper was plated and the depleted electrolyte was recycled to the stripping circuit.

In the zinc recovery circuit zinc was extracted from the aqueous by using DEHPA (10% DEHPA, 5% Isodecanol, 85% Napoleum 470 in volume percentages). The loaded solvent was stripped with 30 g/l $H_2SO_4$ and zinc recovered from the zinc sulfate formed by standard procedures.

The test from which the results of Table 1 were obtained was operated continuously for twenty hours while in the test for the results of Table 2 the process was also operated continuously for twenty-seven hours. At the end of each test complete analyses were performed across the unit and material balances for the last hour of operation were obtained. These material balances are presented in Tables 1 and 2.

TABLE 1

| | | | COPPER | | |
| --- | --- | --- | --- | --- | --- |
| In: | Cu | 34.5 g/l | 500 ml/hr = | 17.25 g | |
| Out: | Bleed recycle | 15.5 g/l | 400 ml/hr = | 6.20 g | |
| | Strip | 41.0 g/l | 240 ml/hr = | 9.84 g | |
| | | | | 17.04 g | vs. 17.25 g in feed 98.8% accounted for |
| | | | ZINC | | |
| In: | Zn | 9.67 g/l | 500 ml/hr = | 4.84 g | |
| Out: | Bleed recycle | 9.20 g/l | 400 ml/hr = | 3.68 g | |
| | Strip Zn | 4.19 g/l | 100 ml/hr = | 0.42 g | |
| | Strip Cu | 0.11 g/l | 240 ml/hr = | 0.03 g | |
| | Raffinate | 0.01 g/l | 100 ml/hr = | | |
| | | | | 4.13 g | vs. 4.84 g in feed 85.3% accounted for |

TABLE 2

COPPER

| | | |
|---|---|---|
| In: Cu | 29.6 g/l | 500 ml/hr = 14.80 g |
| Out: Bleed recycle | 16.4 g/l | 400 ml/hr = 6.56 g |
| Strip | 32.8 g/l | 240 ml/hr = 7.87 g |
| | | 14.43 g vs. 14.80g in feed |
| | | 97.5% accounted for |

ZINC

| | | |
|---|---|---|
| In: Zn | 9.15 g/l | 500 ml/hr = 4.58 g |
| Out: Bleed recycle | 9.15 g/l | 400 ml/hr = 3.66 g |
| Strip Zn | 4.19 g/l | 50 ml/hr = 0.21 g |
| Strip Cu | 0.91 g/l | 240 ml/hr = 0.22 g |
| Raffinate | 5.64 g/l | 100 ml/hr = 0.56 g |
| | | 4.65 g vs. 4.58g in feed |
| | | 101.5% accounted for |

The results show that build-up of zinc in the leach solution can be effectively controlled by use of the flow sheet. The plated copper from the copper strip liquor meets the commercial specifications for this metal. The strip zinc solution was pure enough to warrant the recovery of a basic zinc carbonate, zinc oxide or zinc metal meeting commercial specifications.

What is claimed is:

1. A continuous ion exchange process for the selective recovery of copper and zinc from an ammoniacal ammonium carbonate leach solution in which zinc and copper are continuously added to the leach solution and recovered without build-up of zinc in the leach solution, the process comprising:
   a. contacting the leach solution in an ion exchange circuit for copper with a water immiscible organic phase comprising a copper selective ion exchange agent in an organic diluent,
   b. recycling a bleed portion of the aqueous phase containing copper and zinc from the ion exchange circuit to the leach solution to maintain the cupric-cuprous ratio therein at an active leaching level,
   c. recovering zinc from the remainder of the aqueous phase at a rate substantially equal to the rate of addition of zinc to the leach solution to prevent build-up of zinc in the leach solution,
   d. recycling the raffinate from step (c) to the leach solution, and
   e. recovering copper from said organic phase.

2. The process of claim 1 in which said ion exchange extractant is a benzophenoxime.

3. The process of claim 1 in which said zinc is recovered from said remainder of the aqueous phase by solvent extraction with di 2-ethyl hexyl phosphoric acid.

4. The process of claim 1 in which zinc is recovered from said remainder of the aqueous phase by boiling off ammonia.

5. The process of claim 1 in which zinc is recovered from said remainder of the aqueous phase by adding carbon dioxide.

6. The process of claim 1 in which substantially all of the remainder of copper is removed from said remainder of aqueous phase before removal of zinc therefrom and recycle of the barren raffinate to the leach solution.

7. The process of claim 6 in which the remainder of copper is removed by contacting said remainder of aqueous phase with barren organic phase resulting from stripping copper from said ion exchange agent.

8. The process of claim 7 to which is added the following steps:

f. stripping copper from said ion exchange agent with a stripping agent for copper,
   g. recovering copper from the stripping agent, and,
   h. recycling the barren ion exchange agent from step (f) to step (a) after contacting it with said remainder of aqueous phase.

9. A continuous countercurrent ion exchange process for the selective recovery of copper and zinc from an ammoniacal ammonium carbonate leach solution in which process the cupric-cuprous ratio of the leach solution is maintained at an active leaching level and the copper is recovered in the presence of zinc without build-up of zinc in the leach solution, the process comprising the following operations performed continuously and simultaneously with the aqueous and organic phases passing countercurrent to each other:
   a. continuously adding copper and zinc containing feed to the leach solution in a leaching stage to provide an aqueous phase containing copper and zinc ions,
   b. flowing said aqueous phase to a first copper recovery stage and recovering copper from said aqueous phase by ion exchange by contacting said aqueous phase countercurrently with a water immiscible organic phase comprising a copper selective ion exchange agent in an organic diluent,
   c. recycling a bleed portion of said aqueous phase from the first copper recovery stage of step (b) to the leaching stage to maintain the cupric-cuprous ratio of said leach solution at an active leaching level,
   d. passing the pregnant organic phase to a copper stripping stage to strip copper from the organic phase leaving the organic phase substantially barren,
   e. recycling the barren organic phase to said first copper recovery stage where it is again loaded with copper,
   f. passing the remainder of said aqueous phase to a zinc recovery stage to recover zinc therefrom at a rate substantially equal to the rate of addition of zinc to the leach solution to prevent build-up of zinc in the leach solution, and
   g. recycling spent raffinate from said zinc recovery stage to said leaching stage,
      whereby as zinc and copper are continuously added to said leach solution the cupric-cuprous ratio in said leaching solution is continuously maintained at an active leaching level and zinc is continuously removed from said leach solution at a rate substantially equal to its rate of introduction to prevent zinc build-up in the leach solution.

10. The process of claim 9 including at least one additional copper recovery stage immediately following said first copper recovery stage and the continuous countercurrent circulation of said remainder of aqueous phase and said barren organic phase therethrough before the organic phase is returned to said first copper recovery stage.

* * * * *